DIGITALIZED PHASE LOCKED LOOP DOUBLE CARRIER TRANSMISSION SYSTEM

Filed Dec. 27, 1967 2 Sheets-Sheet 1

INVENTOR
C. F. KURTH
BY R. B. Ardis
ATTORNEY

United States Patent Office 3,550,131
Patented Dec. 22, 1970

3,550,131

DIGITALIZED PHASE LOCKED LOOP DOUBLE CARRIER TRANSMISSION SYSTEM

Carl F. Kurth, Andover, Mass., assignor to Bell Telephone Laboratories, Incorporated, Murray Hill, N.J., a corporation of New York Filed Dec. 27, 1967, Ser. No. 693,922
Int. Cl. H04b *1/52*
U.S. Cl. 343—179 3 Claims

ABSTRACT OF THE DISCLOSURE

A digital double carrier bilateral transmission system is disclosed which comprises a digital transceiver at each end connected by a lossy transmission medium which introduces significant phase shift and attenuation to a modulated carrier passing therethrough. Each transceiver comprises a digital phase locked loop which transmits and receives modulated carriers having different carrier frequencies where the different frequencies are integral multiples of each other.

CROSS REFERENCES TO RELATED APPLICATIONS

The following are related applications: W. B. Gaunt, Jr., Ser. No. 678,398, filed Oct. 26, 1967; C. F. Kurth, Ser. No. 693,904, filed Dec. 27, 1967; C. F. Kurth, Ser. No. 693,905, filed Dec. 27, 1967; C. F. Kurth-F. J. Witt, Ser. No. 694,012, filed Dec. 27, 1967; C. F. Kurth-R. C. MacLean, Ser. No. 693,967, filed Dec. 27, 1967; C. F. Kurth, Ser. No. 693,906, filed Dec. 27, 1967.

BACKGROUND OF THE INVENTION

This invention relates generally to double carrier bilateral tranmission systems and, more particularly, to a digital double carrier bilateral transmission system employing a digital phase locked loop at each end serving as a transceiver.

A single carrier frequency modulated digital bilateral transmission system employing digital phase locked loops at each end has been set forth in an application by C. F. Kurth and R. C. MacLean, Ser. No. 693,967, filed concurrently with the present application. The bilateral transmission system disclosed therein may be utilized where the crosstalk problems in the transmission lines are negligible. When significant crosstalk problems exist, the operation of the single carrier bilateral transmission system may be impaired and provision of a double carrier digital bilateral transmission system may eliminate the crosstalk problems.

The present invention, although not limited to such an application, may be used for telephone transmission. At present, there is an increasing demand for additional telephones in areas in which there is already an overcrowded condition with regard to telephone lines. These telephone lines extend from a central office to individual subscribers served by the central office. When it is unfeasible to install additional lines in these areas, carrier transmission employing pre-existing lines may be employed. Carrier transmission may also be employed in remote areas where telephone lines exist since it may be less expensive to employ carrier transmission than add additional lines. Where carrier transmission is employed, significant crosstalk problems exist for a single carrier bilateral transmission system.

The bilateral transmission system including digital phase locked loops at each end may be employed between a central office and a subscriber. A separate digital phase locked loop is installed at the central office corresponding to a phase locked loop for each subscriber. Since the distance between the central office and each subscriber may vary, the phase shift suffered by a modulated carrier in the transmission medium will also vary. This variation may be compensated for at the time of installation by auxiliary equipment and complex installation procedures. It would be preferable, though, to provide a telephone receiver which automatically compensates for the phase shift suffered by the modulated carrier in the transmission line where the phase shift will vary with each subscriber.

In a patent application by C. F. Kurth, Ser. No. 693,906, filed concurrently with the present application, a digital bilateral transmission system is set forth which compensates for the phase shift suffered by a modulated carrier in a transmission medium. A bilateral phase locked loop system has a limited phase variation range due to a required phase relation between transmitted and received modulated carriers and the loop gain of each phase locked loop. Since the phase shift suffered by a modulated carrier in the transmission medium may be significant, the phase locked loop may be incapable of tracking the received modulated carrier. The phase shift problem is particularly significant in a double carrier digital bilateral transmission system employing a digital phase locked loop at each end. Therefore, the improvement set forth in the patent application filed by C. F. Kurth, Ser. No. 693,906, may be used with the double carrier bilateral transmission system of the present invention.

Another application by C. F. Kurth, Ser. No. 693,905, filed concurrently with the present application, sets forth a system for eliminating the amplitude dependency for reception by a phase locked loop. The loop gain of the phase locked loop is sensitive to the amplitude of the modulated carrier received by the phase locked loop. Therefore, significant attenuation suffered by the modulated carrier in transmission will cause the loop gain of the phase locked loop to markedly vary and degrade its operation. In the related application by C. F. Kurth, Ser. No. 693,905, a digital bilateral transmission system employing a phase locked loop at each end is set forth for use in a single carrier bilateral transmission system which eliminates the amplitude dependency for reception by the phase locked loop. Thus, the loop gain of the phase locked loop is maintained relatively constant. The features of the digital phase locked loop which eliminate amplitude dependency may also be used with the present double carrier bilateral transmission system since the transceiver at each end comprising a phase locked loop may be connected by a lossy transmission medium.

An object of the present invention is to provide a transceiver comprising a digital phase locked loop which may be employed in a transmission system which effectively eliminates crosstalk problems.

Another object of the present invention is to provide a transceiver comprising a digital phase locked loop capable of receiving a modulated carrier having one frequency and transmitting a modulated carrier having a different frequency.

Still another object of the present invention is to provide a double carrier bilateral transmission system employing a transceiver at each end comprising a digital phase locked loop which eliminates crosstalk problems.

Another object of the present invention is to provide a double carrier bilateral transmission system employing a transceiver at each end comprising a phase locked loop transmitting and receiving at modulation frequencies which are integral multiples of each other.

SUMMARY OF THE INVENTION

In accordance with the invention, the above objects are accomplished by providing a transceiver comprising a digital phase locked loop which transmits and receives modulated carriers whose modulation frequencies are unequal. The transceiver receives an analog modulated carrier which is converted to digital form. The received modulated carrier is applied to a first level sensor, the output of which is applied to a first pulse former. As the amplitude of the received modulated carrier rises above a predetermined level, a pulse is initiated in the pulse former and as the amplitude falls below another predetermined level, the pulse is terminated. The series of pulses produced by the first pulse former at frequency $f_2$ are, in accordance with one feature of the present invention, converted to a series of pulses having a frequency $f_1$ where frequencies $f_2$ and $f_1$ are unequal. The frequency converted pulses are then applied to a digital phase comparator. The phase locked loop includes a voltage controlled oscillator which provides a carrier wave having carrier frequency $f_1$ for a signal to be transmitted by the phase locked loop. The output of the oscillator is supplied to the digital phase comparator after passing through a level sensor and pulse former which convert the phase shifted analog output of the voltage controlled oscillator to a series of pulses in the same manner as the digital conversion of the frequency converted received analog modulated carrier.

The digital phase comparator produces an output which is proportional to the time displacement between respective pulses of the pulse trains applied to the phase comparator. This output is then applied to one oscillator and a utilization device.

In accordance with another feature of the present invention, a double carrier bilateral transmission system is provided comprising a transceiver at each end employing a phase locked loop which transmits and receives modulated carriers having different frequencies. At one end the transceiver transmits the modulated carrier to the other transceiver at frequency $f_1$ and receives a modulated carrier transmitted by the other transceiver at carrier frequency $f_2$. Frequency $f_1$ is an integral multiple of frequency $f_2$. The first transceiver converts the modulated carrier having a carrier frequency $f_2$ to a carrier frequency $f_1$, while the other transceiver converts the output of its voltage controlled oscillator having a frequency $f_2$ to a modulated carrier having a frequency $f_1$. Provision of this double carrier bilateral transmission system eliminates crosstalk since transmission and reception are at different carrier frequencies.

DETAILED DESCRIPTION

A single carrier frequency modulated digital bilateral transmission system employing a transceiver at each end comprising a digital phase locked loop has been described in an application by C. F. Kurth and R. C. MacLean, Ser. No. 693,967, filed concurrently with the present invention. When the transmission system encounters significant crosstalk problems, its operation may be impaired and a double carrier bilateral transmission system may eliminate the crosstalk problems.

Figure 1:
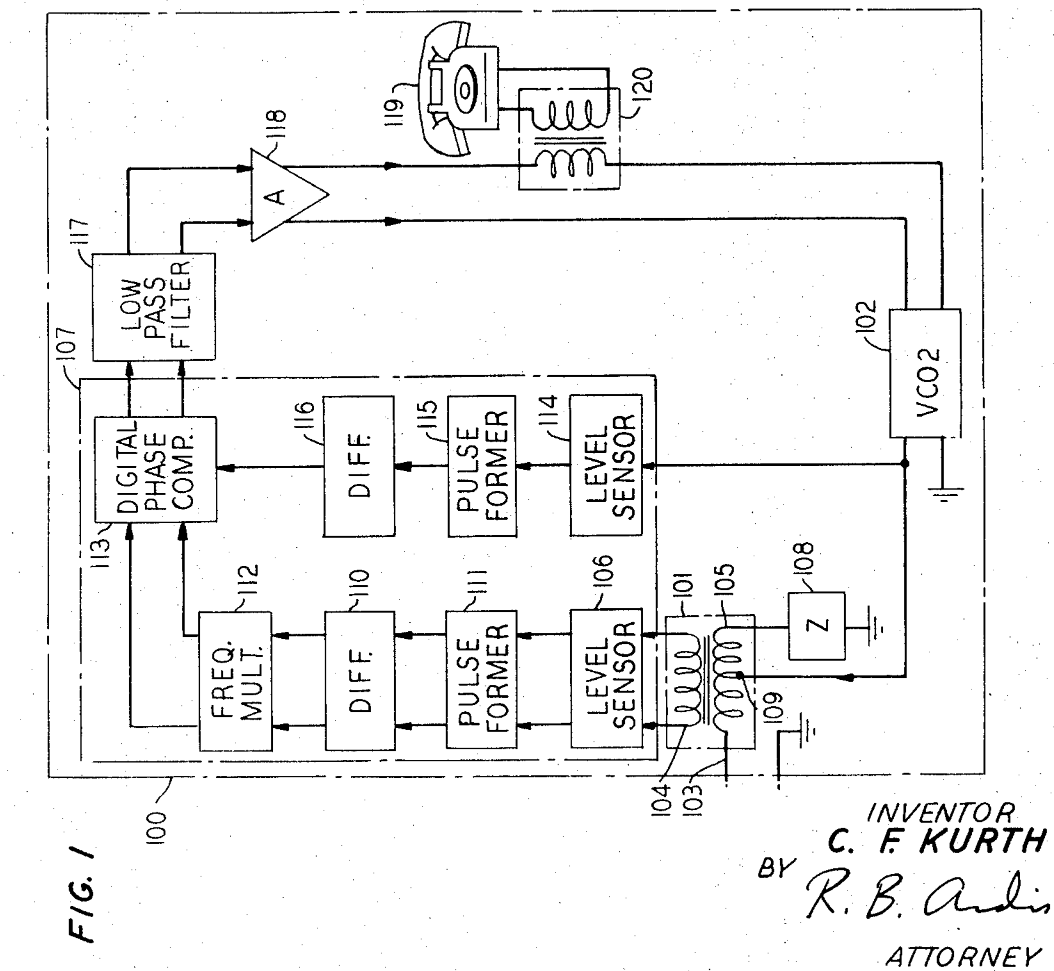
FIG. 1 is a block diagram of a transceiver comprising a digital phase locked loop which transmits and receives modulated carriers having different frequencies.

FIG. 1 is a block diagram of a transceiver comprising a digital phase locked loop which transmits at carrier frequency $f_1$ and receives at carrier frequency $f_2$. Means are provided in transceiver 100 to separate the transmitted from the received modulated carrier. Hybrid 101, which is part of transceiver 100, serves this separation function, insuring that the modulated carrier output of voltage controlled oscillator 102 is transmitted to transmission line 103. A voltage controlled oscillator whose frequency output is linearly proportional to its voltage input may be used in the present invention. An example of a voltage controlled oscillator suitable for use in the present invention may be found on page 67 of "Phaselock Techniques," written by F. M. Gardner and published by John Wiley & Sons, Inc. in 1966. Hybrid 101 consists of primary winding 104 and secondary winding 105. Primary winding 104 is connected to level sensor 106 which is included as part of the analog to digital converter and digital phase comparator 107. One end of secondary winding 105 is connected to terminating impedance 108, while the other end of secondary winding 105 is tapped at point 109 which is connected to voltage controlled oscillator 102. Hybrid 101 insures that the output of voltage controlled oscillator 102 received at point 109 is transferred to transmission line 103 and not transferred to primary winding 104. In addition, hybrid 101 insures that the modulated carrier received by transceiver 100 at secondary winding 105 is transferred to primary winding 104 while not being transferred to voltage controlled oscillator 102. Therefore, the hybrid serves to separate the modulated carrier received from that transmitted by transceiver 100.

The modulated carrier having a carrier frequency $f_2$ received by transceiver 100 is applied to level sensor 106 through hybrid 101. The output of level sensor 106 is connected to differentiator 110 through pulse former 111. Level sensor 106 causes pulse former 111 to initiate a pulse when the level of the modulated carrier received by transceiver 100 crosses a predetermined level and causes pulse former 111 to terminate the pulse when the modulated carrier received by transceiver 100 falls below another predetermined level. Since the signal carried by the carrier received by transceiver 100 causes the modulator frequency to vary, the beginning of each pulse produced by pulse former 111 will vary in accordance with the signal carrier by the modulated carrier received by transceiver 100. The output of pulse former 111 is differentiated by differentiator 110 and, in accordance with one feature of the present invention, before being applied to digital phase comparator 113 is passed through frequency multiplier 112 which changes the pulse repetition rate of the pulse train produced by differentiator 110.

Voltage controlled oscillator 102 produces a carrier wave at frequency $f_1$ for the signal to be transmitted by transceiver 100. The output of voltage controlled oscillator 102 is connected to tapped point 109 of hybrid 101 for transmission through transmission line 103. In addition, the output of voltage controlled oscillator 102 is connected to level sensor 114. Level sensor 114 is connected to pulse former 115 and causes pulse former 115 to initiate a pulse when the output of voltage controlled oscillator 102 rises above a predetermined level and terminate the pulse when the output of voltage controlled oscillator 102 falls below another predetermined level. A series of pulses is produced at the output of pulse former 115 in the same manner as the pulses produced by pulse former 111. The series of pulses produced by pulse former 115 are applied to digital phase comparator 113 through a differentiator 116. The series of pulses produced by pulse former 115 have a pulse repetition rate which is determined by frequency $f_1$ while the series of pulses produced by pulse former 111 have a repetition rate determined by frequency $f_2$, which is the frequency of the received modulated carrier. Frequency multiplier 112 converts the pulse repetition rate of the pulse train produced by differentiator 110 to a pulse train having a repetition rate approximately equal to that produced by pulse former 115, as determined by frequency $f_1$ applied to level sensor 114 and pulse former 115. Since the initiation of pulses in pulse formers 111 and 115 is dependent upon the instantaneous crossings of predetermined levels by the amplitude of the modulated carrier received by transceiver 100 and the output of voltage controlled oscillator 102, respectively, the time difference between respective pulses of the series of pulses applied to phase comparator 113 by multiplier 112 and differentiator 116 will be proportional to the signal carrier by the modulated carrier received by transceiver 100.

Digital phase comparator 113 produces a series of pulses whose widths are proportional to the signal carried by the modulated carrier received by transceiver 100. This series of pulses is applied through low pass filter 117 and amplifier 118 to utilization device 119 through transformer 120. For purposes of illustration, utilization device 119 is shown to be a telephone transmitter and receiver. The output of amplifier 118 is also, in part, supplied to voltage controlled oscillator 102 to adjust the frequency of its output so that it may more nearly equal the converted frequency of the modulated carrier received by transceiver 100.

Voltage controlled oscillator 102 provides a carrier wave at frequency $f_1$ for the signal to be transmitted by transceiver 100. Utilization device 119 modulates the output of voltage controlled oscillator 102 through transformer 120. This modulated frequency output at carrier frequency $f_1$ is transferred to transmission line 103 by hybrid 101.

The initiation of each pulse in the series of pulses applied to digital phase comparator 113 is dependent upon the signal carried by the modulated carrier received by transceiver 100 because the modulating signal causes the modulation frequency and, consequently, the crossing of the predetermined levels by the modulated carrier, to vary. Since carrier frequency $f_2$ is different from carrier frequency $f_1$, frequency multiplier 112 changes the pulse repetition rate output of differentiator 110 to be approximately equal to the pulse repetition rate produced by differentiator 116 which is determined by the output of voltage controlled oscillator 102 at carrier frequency $f_1$. Digital phase comparator 112 is sensitive only to positive pulses. The pulse train produced by differentiator 110 has alternating positive and negative pulses. Frequency multiplier 112 converts the negative pulses to positive pulses, thereby doubling the positive pulse repetition rate. This positive pulse repetition rate is approximately equal to the positive pulse repetition rate produced by differentiator 116, since carrier frequency $f_1$ is approximately twice carrier frequency $f_2$. Digital phase comparator 113 is responsive to the time relationship between respective pulses of the series of pulses it compares and produces a series of pulses whose width varies in response to the time relationship. Level sensor 106 may cause a pulse to be initiated by the pulse former when the level of the modulated carrier rises above zero volts and cause the pulse to be terminated when the level falls below zero volts. By providing that level sensor 106 is sensitive to zero crossings, the pulses produced by the level sensor are independent of the amount of attenuation suffered by the modulated carrier in the transmission medium.

Transceiver 100 utilizes frequency multiplier 112 to convert the pulse repetition rate determined by carrier frequency $f_2$ to a pulse repetition rate which is more nearly equal to carrier frequency $f_1$. One skilled in the art may readily utilize a frequency divider in the path between voltage controlled oscillator 102 and digital phase comparator 113 instead of the frequency multiplier shown in FIG. 1. Any combination of frequency multipliers and dividers may be utilized in the present invention.

Figure 2:
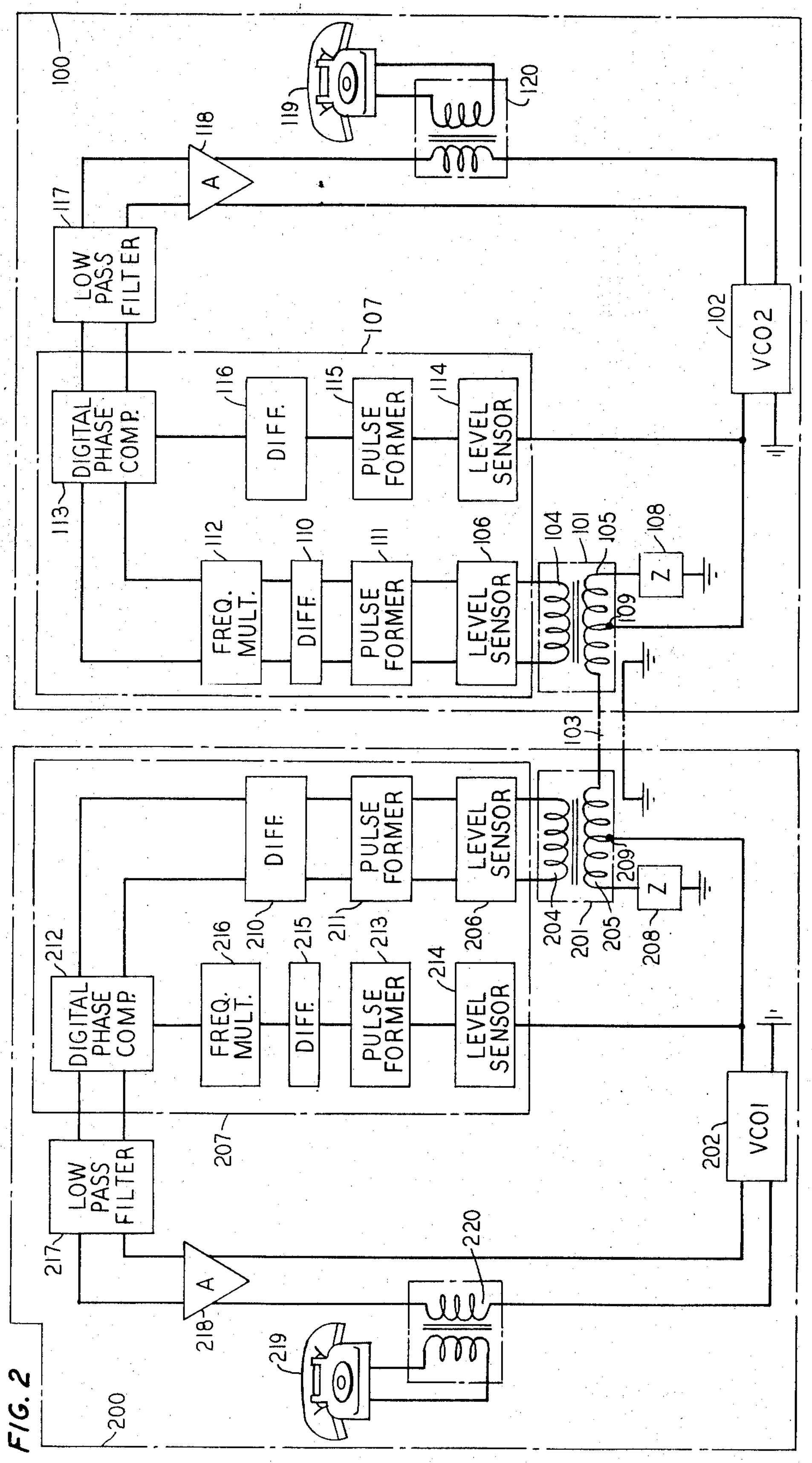
FIG. 2 is a block diagram of a bilateral transmission system comprising a transceiver at each end employing a digital phase locked loop where one transceiver transmits at carrier frequency $f_1$ while the other transmits at carrier frequency $f_2$ with frequencies $f_1$ and $f_2$ being unequal.

FIG. 2 is a block diagram of a digital bilateral transmission system embodying the principles of the present invention so that a double carrier digital bilateral transmission system employing essentially digital phase locked loops at each end as transceivers may be employed when significant crosstalk problems are encountered in the transmission system. The bilateral transmission system comprises a transceiver comprising digital phase locked loop 200, transmission line 103, and transceiver 100. The operation of transceiver 100 has been set forth and fully explained in FIG. 1. Therefore, the same numerals are employed in FIG. 2 for transceiver 100 in explaining its operation as part of the diigtal bilateral transmission system.

Transceiver 200 transmits and receives a modulated carrier to and from transceiver 100 respectively. Means are provided in transceiver 200 to separate the transmitted from the received modulated carrier. Hybrid 201, which is part of transceiver 200, serves this separation function, insuring that the modulated carrier output of voltage controlled oscillator 202 is transmitted to transmission line 103. A voltage controlled oscillator whose frequency output is linearly proportional to its voltage input may be used in the present invention. An example of a voltage controlled oscillator suitable for use in the present invention may be found on page 67 of "Phaselock Techniques," written by F. M. Gardner and published by John Wiley & Sons, Inc. in 1966. Hybrid 201 consists of primary winding 204 and secondary winding 205. Primary winding 204 is connected to level sensor 206 which is included as part of the analog to digital converter and digital phase comparator 207. One end of secondary winding 205 is connected to terminating impedance 208 while the other end of secondary winding 205 is connected to transmission line 103. Secondary winding 205 is tapped at point 209 which is connected to voltage controlled oscillator 202. Hybrid 201 insures that the output of voltage controlled oscillator 202 received at point 209 is transferred to transmission line 103 and not transferred to primary winding 204. In addition, hybrid 201 insures that the modulated carrier at carrier frequency $f_1$ transmitted by transceiver 100 received by transceiver 200 at secondary winding 205 is transferred to primary winding 204 while not being transferred to voltage controlled oscillator 202. Therefore, the hybrid serves to separate the modulated carrier received from that transmitted by transceiver 200.

The modulated carrier received by transceiver 200 is applied to level sensor 206 through hybrid 201. The output of level sensor 206 is connected to differentiator 210 through pulse former 211. Level sensor 206 causes pulse former 211 to initiate a pulse when the level of the modulated carrier received by transceiver 200 crosses a predetermined level and causes pulse former 211 to terminate the pulse when the modulated carrier received by transceiver 200 falls below another predetermined level. Since the signal carried by the carrier received by transceiver 100 causes the modulator frequency to vary, the beginning of each pulse produced by pulse former 211 will vary in accordance with the signal carried by the modulated carrier received by transceiver 200. The output of pulse former 211 is differentiated by differentiator 210 before being applied to digital phase comparator 212.

Voltage controlled oscillator 202 provides a carrier wave at carrier frequency $f_2$ for the signal to be transmitted by transceiver 200. The output of voltage controlled oscillator 202 is connected to tapped point 209 of hybrid 201 for transmission through transmission line 103. In addition, the output of voltage controlled oscillator 202 is connected to pulse former 213 through level sensor 214. Level sensor 214 causes pulse former 213 to initiate a pulse when the output of voltage controlled oscillator 202 rises above a predetermined level and terminate the pulse when the output of voltage controlled oscillator 202 falls below a predetermined level. A series of pulses is produced at the output of pulse former 213 in the same manner as the pulses produced by pulse former 211. The series of pulses produced by pulse former 213 are applied to differentiator 215. In accordance with another feature of the present invention, the repetition rate of the positive pulses produced by differentiator 215 is multiplied by multiplier 216. The multiplied pulse train is then applied to digital phase comparator 212. Since the initiation of pulses in pulse formers 211 and 213 is dependent upon the instantaneous crossings of predetermined levels by the amplitude of the modulated carrier received by transceiver 200 and the output of voltage controlled oscillator 202, respectively, the time difference between respective pulses of the series of pulses applied to phase comparator 212 by differentiators 210 and 215 will be proportional to the signal carried by the modulated carrier received by transceiver 200.

Transceiver 100 transmits at carrier frequency $f_1$ while transceiver 200 transmits at carrier frequency $f_2$. Included within transceivers 100 and 200 are means to equalize the pulse repetition rates derived from the received modulated carrier and the output of the voltage controlled oscillator. Frequencies $f_1$ and $f_2$ are integrally related in that frequency $f_1$ is approximately twice frequency $f_2$. Provision of this double carrier bilateral transmission system eliminates crosstalk problems previously encountered in a transmission system utilizing a single carrier. It would be obvious to one of ordinary skill in the art to devise a double carrier bilateral transmission system where frequency $f_1$ is other than twice frequency $f_2$.

Digital phase comparator 212 produces a series of pulses whose widths are proportional to the signal carried by the modulated carrier received by transceiver 200. This series of pulses is applied through low pass filter 217 and amplifier 218 to utilization device 219 through transformer 220. For purposes of illustration, utilization device 219 is shown to be a telephone transmitter and receiver. The output of amplifier 218 is also, in part, supplied to voltage controlled oscillator 202 to adjust the frequency of its output so that, when multiplied by multiplier 216, it may more nearly equal the frequency of the modulated carrier received by transceiver 200.

Voltage controlled oscillator 202 provides a carrier wave for the signal to be transmitted by transceiver 200. Utilization device 219 modulates the output of voltage controlled oscillator 202 through transformer 220. This modulated frequency output is transferred to transmission line 103 by hybrid 201.

The initiation of each pulse in the series of pulses applied to digital phase comparator 212 is dependent upon the signal carried by the modulated carrier received by transceiver 200 because the modulating signal causes the modulation frequency and, consequently, the crossing of the predetermined level by the modulated carrier, to vary. Digital phase comparator 212 is responsive to the time relationship between respective pulses of the series of pulses it compares and produces a series of pulses whose width varies in response to the time relationship. Level sensor 206 may cause a pulse to be initiated by the pulse former when the level of the modulated carrier rises above zero volts and cause the pulse to be terminated when the level falls below zero volts. By providing that level sensor 106 is sensitive to zero crossings, the pulses produced by the level sensor are independent of the amount of attenuation suffered by the modulated carrier in the transmission medium.

The digital bilateral transmission system in FIG. 2 comprises phase locked loop 200 and transceiver 100 interconnected by transmission line 103. The operations of digital phase locked loop 200 and transceiver 100 have been described above with a view to their being used in a bilateral transmission system as shown in FIG. 2. It is, therefore, unnecessary to repeat the detailed description of the operation of transceiver 100 since its operation was explained in detail with reference to FIG. 1.

The digital bilateral double carrier transmission system employing a transceiver at each end shown in FIG. 2 eliminates crosstalk problems encountered in the prior art. Transceiver 100 transmits a modulated carrier at carrier frequency $f_1$ to transceiver 200, while transceiver 200 transmits a modulated carrier at carrier frequency $f_2$ to transceiver 100. In accordance with one feature of the present invention, provision is made in transceivers 100 and 200 to equalize the carrier frequency of the received modulated carrier to the output frequency of the voltage controlled oscillator.

Figure 3:
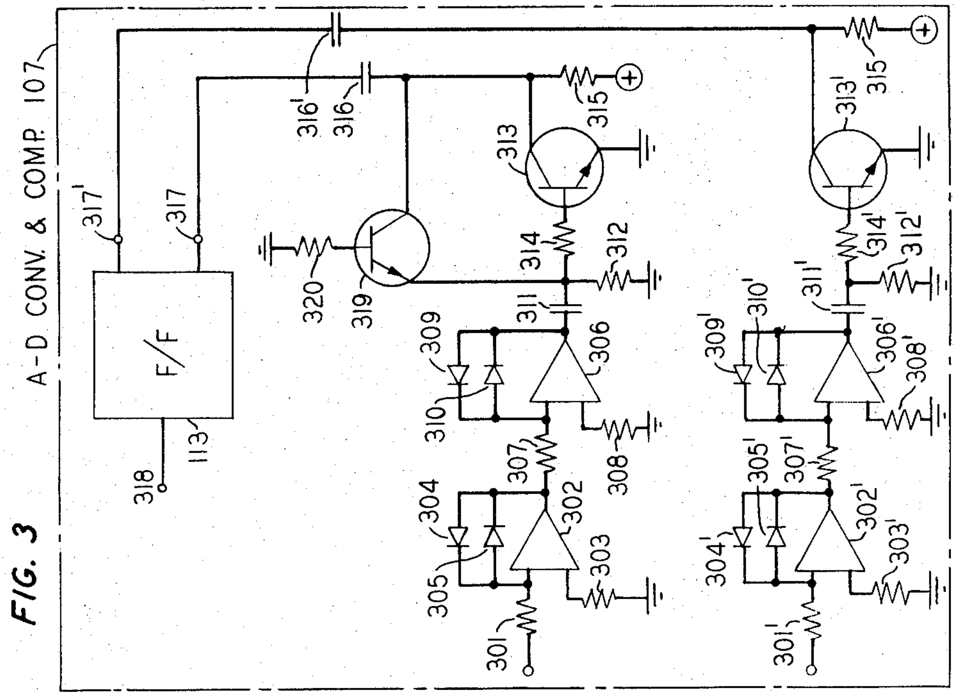
FIG. 3 is a schematic diagram of an analog to digital converter and digital phase comparator that may be used in the systems represented by FIGS. 1 and 2.

FIG. 3 is a schematic diagram of an analog to digital converter and digital phase comparator that may be utilized in FIGS. 1 and 2, respectively. A significant portion of the upper and lower portions of the bottom part of FIG. 3 have the same operation and primed numerals are used for the lower part to distinguish it from the upper. The description of operation of FIG. 3 will relate to the upper portion, while the operation of the bottom portion that is the same as the top and designated by primed numerals, will not be set forth since it would be merely repetitious.

The modulated carrier received by transceiver 100 is transferred to one end of resistor 301, the second end of which is connected to the input of operational amplifier 302. A reference voltage of zero volts potential is applied to operational amplifier 302 through resistor 303. The anode of diode 304 is connected to the output of operational amplifier 302, while the cathode of diode 304 is connected to the second end of resistor 301. The anode terminal of diode 305 is connected to the second end of resistor 301, while the cathode terminal is connected to the output of operational amplifier 302. As the modulated carrier rises above zero volts, a pulse will be produced at the output of operational amplifier 302 and, as the amplitude of the modulated carrier received by transceiver 100 falls below zero volts, the pulse will be terminated at the output of operational amplifier 302. Diodes 304 and 305 limit the output level of operational amplifier 302. Therefore, the modulated carrier received by transceiver 100 will be converted to a series of pulses where each pulse will be initiated as the amplitude of the modulatesd carrier received by transceiver 100 rises above zero volts and terminated when the amplitude falls below zero volts. In order to insure the accuracy of the analog to digital conversion, a second level sensor and conversion stage is utilized. The output of operational amplifier 302 is connected to a first input terminal of operational amplifier 306 through resistor 307. A reference voltage of zero volts is applied to the second input of operational amplifier 306 through resistor 308. The anode terminal of diode 309 is connected to the output of operational amplifier 306, while the cathode side of diode 309 is connected to the first input terminal of operational amplifier 306. The anode side of diode 310 is connected to the first input terminal of operational amplifier 306, and the cathode terminal of diode 310 is connected to the output of operational amplifier 306. Diodes 309 and 310 limit the amplitude of the output of operational amplifier 306.

The output of operational amplifier 306 is applied to a differentiator comprising capacitor 311 and resistor 312. The output of operational amplifier 306 is applied to one end of capacitor 311, while the other end of capacitor 311 is applied to ground through resistor 312. Differentiation of the pulses produced by operational amplifier 306 increases the accuracy of the conversion since the differentiation further emphasizes the initiation point of each pulse.

The differentiated pulses are then amplified before being applied to a digital phase comparator. Numeral 113 is used in FIG. 3 since it represents the digital phase comparator set forth in FIG. 1. The second side of capacitor 311 is connected to the base of NPN transistor 313 through load resistor 314. A positive source of reference potential is connected to the collection terminal of NPN transistor 313 through load resistor 315. The collector of NPN transistor 313 is capacitively coupled through capacitor 316 to input terminal 317 of digital phase comparator 112.

The electrical wave appearing at the interconnection point between capacitor 311 and resistor 312 is an alternating series of positive and negative pulses. Phase comparator 113 is a flip-flop which is sensitive only to negative pulses applied thereto. A positive pulse applied to transistor NPN 313 causes it to turn on and produce a negative pulse at its collector.

An example of one method that may be used to double the negative pulse repetition rate as applied to flip-flop 113 is shown in FIG. 3. The emitter of NPN transistor 319 is connected to the interconnection point between capacitor 311 and resistor 312. The base of NPN transistor 319 is connected to ground through biasing resistor 320. The collector of NPN transistor 319 is connected to a source of positive potential through load resistor 315. A negative pulse applied to the emitter of NPN transistor 319 causes it to turn ON and produce a negative pulse at its collector. Thus both the negative and positive pulses appearing at the interconnection point between capacitor 311 and resistor 312 produce negative pulses which are applied to flip-flop 113 through coupling capacitor 316. Therefore, the pulse repetition applied to input terminal 317 of flip-flop 113 has been doubled. The analog to digital converter and digital phase comparator shown in FIG. 3 may be used in transceiver 100, with the received modulated carrier being applied to resistor 301. The output of voltage controlled oscillator 102 is also converted to a series of pulses and applied to digital phase comparator 112 by the lower circuit designated by primed numerals. The output of voltage controlled oscillator 102 is applied to one end of resistor 301′.

The operation of the lower part of the bottom portion of FIG. 3 is substantially the same as the operation of the upper part described above. The lower part of the bottom portion of FIG. 3 differs from the upper part in that the multiplier which converts the pulse repetition rate is absent. Since the output of the voltage controlled oscillator is approximately twice the frequency of the modulated carrier received at resistor 301, its pulse repetition rate will approximately equal that applied to input terminal 317 of flip-flop 113. Thus the pulse repetition rates applied to terminals 317 and 317′ will be approximately equal. When the analog to digital converter and digital phase comparator are used in transceiver 200, the output of voltage controlled oscillator 202 is applied to the first side of resistor 301, while the received modulated carrier is applied to the first side of resistor 301′. Since the frequency of the modulated carrier received by transceiver 200 is approximately twice that produced by voltage controlled oscillator 202, the output of voltage controlled oscillator 202 is passed through the frequency multipler, which is the upper part of the lower portion of FIG. 3.

Digital phase comparator 113 comprises a standard bistable multivibrator (flip-flop). When the converted, differentiated, multiplied and amplified pulse derived from the modulated carrier received by transceiver 100 is applied to flip-flop 113 through capacitor 316 at terminal 317 its output at terminal 318 is caused to go positive. When the subsequent converted, differentiated, and amplified output of voltage controlled oscillator 102 is applied to input terminal 317′ of flip-flop 113, the output produced at terminal 318 is caused to return to its ground state. Flip-flop 113 will change state each time a pulse is applied to either terminal 317 or 317′. Therefore, a pulse will be produced whose width is determined by the time relationship between respective pulses of the pulse trains applied to flip-flop 113 which cause it to change state. Use of a bistable multivibrator which varies between positive potential and ground is arbitrary and any suitable bistable multivibrator may be used with the present invention.

Since the signal carried by the modulated carrier received by transceiver 100 causes the frequency of the modulated carrier to vary, it will cause the zero crossing of the modulated carrier to vary with respect to time. Therefore, the initiation of the pulse output of flip-flop 113 will be determined by this frequency variation. The output pulse width produced at terminal 318 of flip-flop 113 will be proportional to the time difference between the zero crossings of the received modulated carrier and the output of voltage controlled oscillator 102.

FIG. 3 has set forth an analog to digital converter and digital phase comparator which multiplies the pulse repetition rate of the pulse train derived from the modulated carrier having a carrier frequency $f_2$. It would be obvious to one with ordinary skill in the art to utilize a frequency divider which divided the pulse repetition rate of the pulse train deriving from the modulated carrier at carrier frequency $f_1$. Any combination of multipliers or dividers may be utilized in the present invention.

The transceivers disclosed in the present invention include level sensors and pulse formers to convert an analog periodic signal to a series of pulses. It is to be understood that any conversion means which converts an analog periodic signal to a series of pulses having the same period as the analog periodic signal may be used in the present invention.

It is to be understood that the embodiments of the invention which have been described are merely illustrative of the application of the principles of the invention. Numerous modifications may readily be devised by those skilled in the art without departing from the spirit and scope of the invention.

What is claimed is:

1. A digitalized phase locked loop transceiver for transmitting modulated carrier at carrier frequency $f_1$ and receiving modulated carrier at carrier frequency $f_2$, frequency $f_1$ being an integral multiple of frequency $f_2$, comprising oscillating means for producing a first analog signal, the frequency of the first analog signal being proportional to the voltage at the input of said oscillating means and being equal to carrier frequency $f_1$ whenever the voltage at the input of said oscillating means is zero, means for applying the first analog signal to a transmission medium, means for receiving a second analog signal comprising a modulated carrier at carrier frequency $f_2$ from the transmission medium, means responsive to the first analog signal for producing a first pulse signal, the pulses of the first pulse signal occurring whenever the first analog signal rises above or falls below a reference level, means responsive to the second analog signal for producing a second pulse signal, the pulses of the second pulse signal occurring whenever the second analog signal rises above or falls below the reference level, conversion means for increasing the rate of occurrence of pulses of the second pulse signal by a multiplication factor, means responsive to the first pulse signal and to the output signal from said conversion means for linearly producing an information signal proportional to the time displacement between respective pulses of the first pulse signal and the output signal from said conversion means, means for filtering from the information signals all of the component frequencies greater than a cutoff frequency, means for amplifying the unfiltered components of the information signal, means for applying the amplified components of the information signal to a utilization device and to the input of said oscillating means, and means for applying signals from said utilization device to the input of said oscillating means.

2. A digitalized phase locked loop transceiver as claimed in claim 1 wherein said means for producing a first signal comprises:

a first level sensing means,
a first pulse forming means, and
a first differentiating circuit,
said first level sensing means indicating to said first pulse forming means whenever the first analog signal rises above the first reference level or falls below the second reference level, said first pulse forming means initiating a pulse whenever the first analog signal rises above the first reference level and terminating the pulse whenever the first analog signal falls below the second reference level, and said differentiating circuit taking a first time derivative of pulses from said first pulse forming means, the first time derivative comprising the first pulse signal, and
said means for producing a second pulse signal comprises:
a second level sensing means,
a second pulse forming means, and
a second differentiating circuit,
said second level sensing means indicating to said second pulse forming means whenever the second analog signal rises above a third reference level or falls below a fourth reference level,
said second pulse forming means initiating a pulse whenever the second analog signal rises above the third reference level and terminating the pulse whenever the second analog signal falls below the fourth reference level, and said second differentiating circuit taking a second time derivative of pulses from said second pulse forming means, the second time derivative comprising the second pulse signal.

3. A bilateral double carrier transmission system comprising a first digitalized phase locked loop transceiver connected by a transmission medium to a second digitalized phase locked loop transceiver, said first transceiver transmitting a first analog signal comprising a modulated carrier of carrier frequency $f_1$ to said second transceiver over said transmission medium and said second transceiver transmitting a second analog signal comprising a modulated carrier of carrier frequency $f_2$ over said transmission medium to said first transceiver, said transceiver comprising:

first oscillating means for producing a first analog signal, the frequency of the first analog signal being proportional to the voltage at the input of said first oscillating means and being equal to carrier frequency $f_1$ whenever the voltage at the input of said first oscillating means is zero,
means for applying the first analog signal to said transmission medium,
means for receiving the second analog signal from said transmission medium,
means responsive to the first analog signal for producing a first pulse signal, the pulses of the first pulse signal occurring whenever the first analog signal rises above or falls below a reference level,
means responsive to the second analog signal for producing a second pulse signal, the pulses of the second pulse signal occurring whenever the second analog signal rises above or falls below the reference level,
first conversion means for increasing the rate of occurrence of pulses of the second pulse signal by a multiplication factor, means responsive to the first pulse signal and to the output signal from said first conversion means for lienarly producing a first information signal proportional to the time displacement between respective pulses of the first pulse signal and the output signal from said first conversion means,
means for filtering from the first information signal all of the component frequencies greater than a cutoff frequency,
means for amplifying the unfiltered components of the first information signal,
means for applying the amplified components of the first information signal to a first utilization device and to the input of said first oscillating means, and
means for applying signals from said first utilization device to the input of said first oscillating means, and
said second phase locked loop comprises:
second oscillating means for producing the second analog signal, the frequency of the second analog signal being proportional to the voltage at the input of said oscillating means and being equal to carrier frequency $f_2$ whenever the voltage at the input of said second oscillating means is zero,
means for applying the second analog signal to said transmission medium,
means for receiving the first analog signal from said transmission medium,
means responsive to the first analog signal for producing a third pulse signal, the pulses of the third pulse signal occurring whenever the first analog signal rises above or falls below the reference level,
means responsive to the second analog signal for producing a fourth pulse signal, the pulses of the fourth pulse signal occurring whenever the second analog signal rises above or falls below the reference level,
second conversion means for increasing the rate of occurrences of pulses of the fourth pulse signal by the multiplication factor,
means responsive to the third pulse signal and to the output signal from said second conversion means for linearly producing an information signal proportional to the time displacement between respective pulses of the third pulse signal and the output signal from said second conversion means,
means for filtering from the second information signal all of the component frequencies greater than the cutoff frequency,
means for amplifying the unfiltered components of the second information signal,
means for applying the amplified components of the second information signal to a second utilization device and to the input of said second oscillating means, and
means for applying signals from said second utilization device to the input of said second oscillating means.

References Cited

UNITED STATES PATENTS

| | | | |
|---|---|---|---|
| 3,230,453 | 1/1966 | Boor et al. | 325—67 |
| 3,329,900 | 7/1967 | Graves | 325—421X |
| 3,354,398 | 11/1967 | Broadhead et al. | 328—133 |

RICHARD MURRAY, Primary Examiner
B. V. SAFOUREK, Assistant Examiner

U.S. Cl. X.R.

179—2.5; 325—17, 58, 63; 329—50